US007643911B2

(12) United States Patent
Ishihara et al.

(10) Patent No.: US 7,643,911 B2
(45) Date of Patent: Jan. 5, 2010

(54) VEHICLE PERIPHERY DISPLAY CONTROL SYSTEM

(75) Inventors: Nobuaki Ishihara, Nagoya (JP); Ichirou Yoshida, Takahama (JP)

(73) Assignee: DENSO CORPORATION, Kariya (JP)

( * ) Notice: Subject to any disclaimer, the term of this patent is extended or adjusted under 35 U.S.C. 154(b) by 804 days.

(21) Appl. No.: 11/110,956

(22) Filed: Apr. 21, 2005

(65) Prior Publication Data

US 2005/0240342 A1   Oct. 27, 2005

(30) Foreign Application Priority Data

Apr. 22, 2004   (JP)   ............... 2004-126527

(51) Int. Cl.
*G05D 3/00* (2006.01)

(52) U.S. Cl. ............... 701/1; 701/207; 701/208; 701/211; 701/213; 701/301

(58) Field of Classification Search ............ 701/1, 701/207, 208, 211, 213, 301
See application file for complete search history.

(56) References Cited

U.S. PATENT DOCUMENTS

| | | | | |
|---|---|---|---|---|
| 5,166,878 | A * | 11/1992 | Poelstra ............... | 701/200 |
| 5,731,832 | A * | 3/1998 | Ng ............... | 348/155 |
| 6,330,511 | B2 | 12/2001 | Ogura et al. | |
| 7,046,171 | B2 * | 5/2006 | Yanai ............... | 340/995.1 |
| 7,216,035 | B2 * | 5/2007 | Hortner et al. ............... | 701/211 |
| 2005/0146607 | A1 * | 7/2005 | Linn et al. ............... | 348/148 |
| 2006/0155467 | A1 * | 7/2006 | Hortner et al. ............... | 701/211 |
| 2007/0136041 | A1 * | 6/2007 | Sheridan ............... | 703/8 |

FOREIGN PATENT DOCUMENTS

| | | |
|---|---|---|
| JP | A-H09-058343 | 3/1997 |
| JP | A-9-178505 | 7/1997 |
| JP | 2000-207696 | 7/2000 |
| JP | 2000-238594 | 9/2000 |
| JP | A-2001-233150 | 8/2001 |
| JP | A-2002-117496 | 4/2002 |
| JP | A-2003-81014 | 3/2003 |
| JP | A-2003-159995 | 6/2003 |
| JP | A-2003-312415 | 11/2003 |

OTHER PUBLICATIONS

Notification of Reasons for Rejection dated Sep. 4, 2007 in corresponding Japanese Patent Application No. 2004-126527 (and English translation).

* cited by examiner

*Primary Examiner*—Khoi Tran
*Assistant Examiner*—Nikhil Sriraman
(74) *Attorney, Agent, or Firm*—Posz Law Group, PLC

(57) ABSTRACT

A vehicle periphery display control system displays peripheral images of a vehicle which are captured by a plurality of cameras mounted on the vehicle in respective different positions thereon. A storage medium stores road configuration information of a road. A positioning unit identifies the present position of the vehicle on the road. A image switching decision unit selects either one of images captured by the cameras based on specific road configuration information of a peripheral area around the vehicle, which includes the present position identified by the present position identifying unit, of the road configuration information stored in the storage medium. The image switching decision unit controls a display unit to display the image selected by the selecting unit.

15 Claims, 12 Drawing Sheets

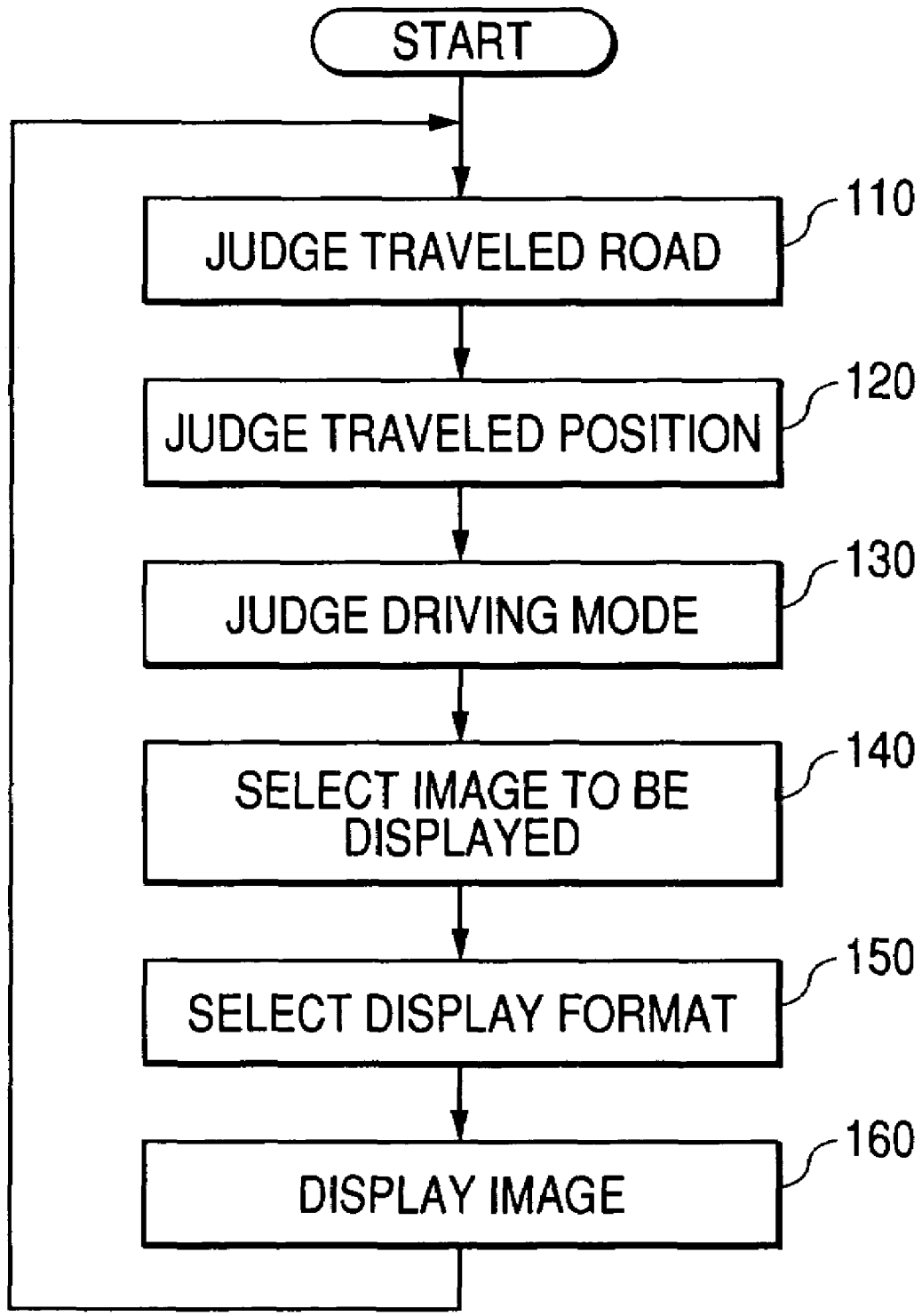

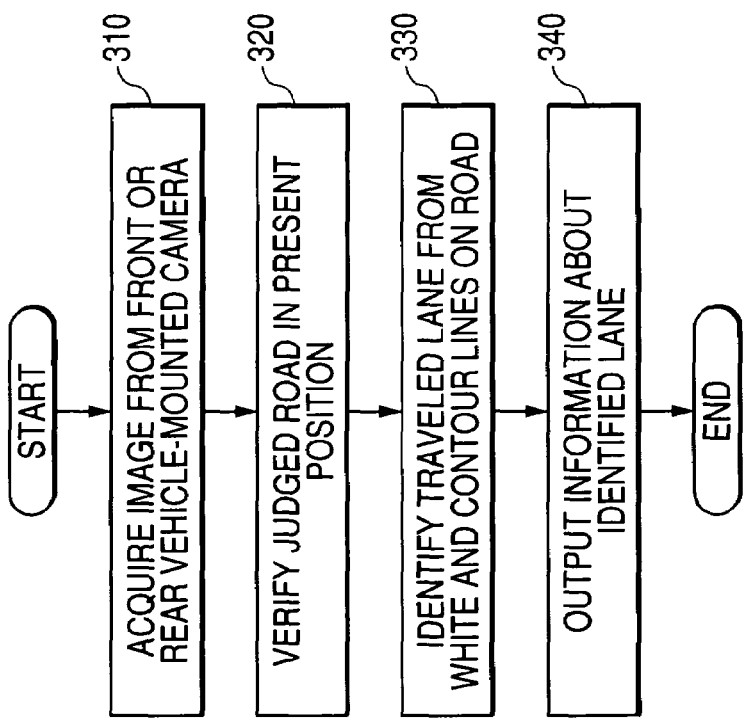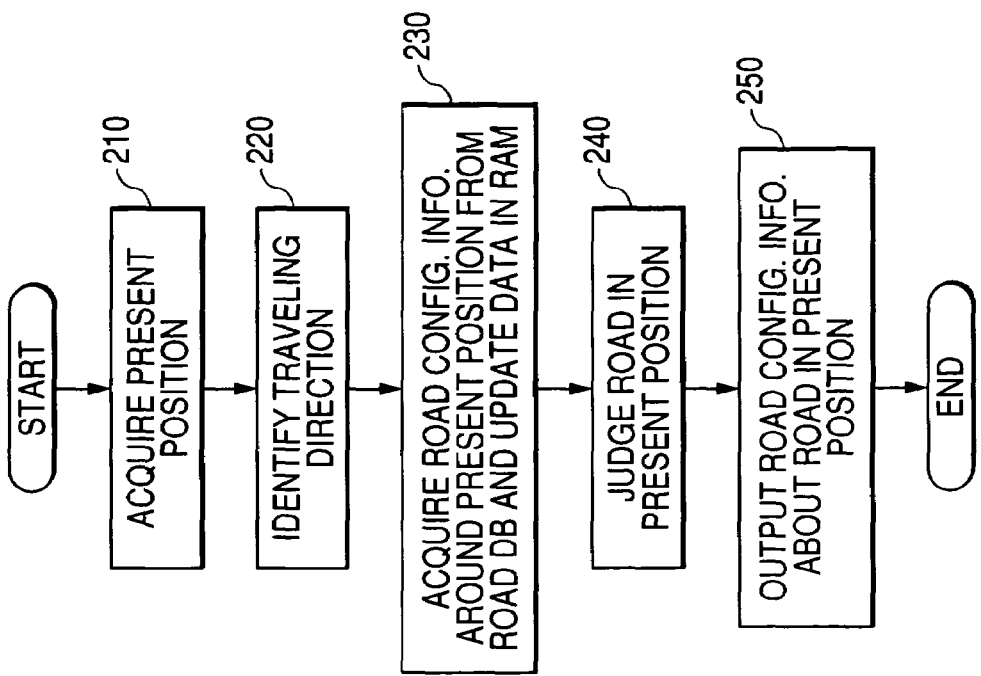

FIG. 8A

| NO. OF LANES | TRAVELED LANE | ROAD/DRIVING INFORMATION | LEFT-HAND CAMERA | RIGHT-HAND CAMERA | REASONS FOR CHANGING DISPLAYED IMAGES |
|---|---|---|---|---|---|
| ONE LANE | — | SIMPLE ROAD | ✓ | | TO PREVENT MOTORCYCLE OVERSIGHT |
| | | MERGING ROAD (RIGHT) | | ✓ | TO CONFIRM ONCOMING VEHICLE FROM RIGHT MERGING ROAD |
| | | MERGING ROAD (LEFT) | ✓ | | TO CONFIRM ONCOMING VEHICLE FROM LEFT MERGING ROAD |
| | | LEFT TURN AHEAD | ✓ | | TO PREVENT MOTORCYCLE OVERSIGHT |
| | | RIGHT TURN AHEAD | | ✓ | TO PREVENT MOTORCYCLE OVERSIGHT |
| TWO LANES | LEFT LANE | SIMPLE ROAD | ✓ | ✓ | TO PREVENT MOTORCYCLE OVERSIGHT, TO CONFIRM RIGHT REAR SIDE WHEN CHANGING LANES |
| | | MERGING ROAD (RIGHT) | ✓ | ✓ | TO PREVENT MOTORCYCLE OVERSIGHT, TO CONFIRM RIGHT REAR SIDE WHEN CHANGING LANES |
| | | MERGING ROAD (LEFT) | ✓ | | TO CONFIRM ONCOMING VEHICLE FROM LEFT MERGING ROAD |
| | | LEFT TURN AHEAD | ✓ | | TO PREVENT MOTORCYCLE OVERSIGHT |
| | | RIGHT TURN AHEAD | | ✓ | TO CONFIRM RIGHT REAR SIDE WHEN CHANGING LANES |
| | RIGHT LANE | SIMPLE ROAD | ✓ | | TO CONFIRM LEFT REAR SIDE WHEN CHANGING LANES |
| | | MERGING ROAD (RIGHT) | | ✓ | TO CONFIRM ONCOMING VEHICLE FROM RIGHT MERGING ROAD |
| | | MERGING ROAD (LEFT) | ✓ | | TO CONFIRM LEFT REAR SIDE WHEN CHANGING LANES |
| | | LEFT TURN AHEAD | ✓ | | TO CONFIRM LEFT REAR SIDE WHEN CHANGING LANES |
| | | RIGHT TURN AHEAD | | ✓ | TO PREVENT MOTORCYCLE OVERSIGHT |

FIG. 8B

| THREE OR MORE LANES | | | | |
|---|---|---|---|---|
| LEFTMOST LANE | SIMPLE ROAD | ✓ | ✓ | TO PREVENT MOTORCYCLE OVERSIGHT, TO CONFIRM RIGHT REAR SIDE WHEN CHANGING LANES |
| | MERGING ROAD (RIGHT) | ✓ | ✓ | TO PREVENT MOTORCYCLE OVERSIGHT, TO CONFIRM RIGHT REAR SIDE WHEN CHANGING LANES |
| | MERGING ROAD (LEFT) | ✓ | | TO CONFIRM ONCOMING VEHICLE FROM LEFT MERGING ROAD |
| | LEFT TURN AHEAD | ✓ | | TO PREVENT MOTORCYCLE OVERSIGHT |
| | RIGHT TURN AHEAD | | ✓ | TO CONFIRM RIGHT REAR SIDE WHEN CHANGING LANES |
| MIDDLE LANE | SIMPLE ROAD | ✓ | ✓ | TO CONFIRM LEFT REAR SIDE WHEN CHANGING LANES, TO CONFIRM RIGHT REAR SIDE WHEN CHANGING LANES |
| | MERGING ROAD (RIGHT) | ✓ | ✓ | TO CONFIRM LEFT REAR SIDE WHEN CHANGING LANES, TO CONFIRM RIGHT REAR SIDE WHEN CHANGING LANES |
| | MERGING ROAD (LEFT) | ✓ | ✓ | TO CONFIRM LEFT REAR SIDE WHEN CHANGING LANES, TO CONFIRM RIGHT REAR SIDE WHEN CHANGING LANES |
| | LEFT TURN AHEAD | ✓ | | TO CONFIRM LEFT REAR SIDE WHEN CHANGING LANES |
| | RIGHT TURN AHEAD | | ✓ | TO CONFIRM RIGHT REAR SIDE WHEN CHANGING LANES |
| RIGHTMOST LANE | SIMPLE ROAD | ✓ | ✓ | TO CONFIRM LEFT REAR SIDE WHEN CHANGING LANES |
| | MERGING ROAD (RIGHT) | ✓ | ✓ | TO CONFIRM ONCOMING VEHICLE FROM RIGHT MERGING ROAD |
| | MERGING ROAD (LEFT) | ✓ | | TO CONFIRM LEFT REAR SIDE WHEN CHANGING LANES |
| | LEFT TURN AHEAD | ✓ | | TO CONFIRM LEFT REAR SIDE WHEN CHANGING LANES |
| | RIGHT TURN AHEAD | | ✓ | TO PREVENT MOTORCYCLE OVERSIGHT |

VEHICLE PERIPHERY DISPLAY CONTROL SYSTEM

CROSS-REFERENCE TO RELATED APPLICATIONS

This application is based upon and claims the benefits of priority from the prior Japanese Patent Application No. 2004-126527, filed on Apr. 22, 2004, the entire contents of which are incorporated herein by reference.

BACKGROUND OF THE INVENTION

1. Field of the Invention

The present invention relates to a vehicle periphery display control system for displaying images of the periphery of a vehicle which are captured by cameras mounted on the vehicle.

2. Description of the Related Art

There have heretofore been available systems for displaying vehicle periphery images captured by cameras mounted on a vehicle for the vehicle driver to see while driving the vehicle. One known such system is disclosed as a vehicle periphery monitoring device in Japanese laid-open patent publication No. 2003-81014, for example. According to the disclosed vehicle periphery monitoring device that is installed on a vehicle, when a driver's action to operate the turn indicator for indicating a left turn or a right turn is detected, the image displayed by the vehicle periphery monitoring device switches to an image captured on the left-hand side of the vehicle or an image captured on the right-hand side of the vehicle.

The above conventional vehicle periphery monitoring device changes displayed images only when the driver operates the turn indicator. Therefore, the conventional vehicle periphery monitoring device is unable to change displayed images depending on the running state of the vehicle that is not related to the operation of the turn indicator.

SUMMARY OF THE INVENTION

It is an object of the present invention to provide a vehicle periphery display control system for changing displayed vehicle periphery images captured by cameras mounted on a vehicle based on road configuration information about the road on which the vehicle is traveling.

According to the present invention, there is provided a vehicle periphery display control system for displaying peripheral images of a vehicle which are captured by a plurality of cameras mounted on the vehicle in respective different positions thereon. The vehicle periphery display control system includes a storage medium for storing road configuration information, a present position identifying unit for identifying the present position of the vehicle, a selecting unit for selecting either one of images captured by the cameras based on specific road configuration information of a peripheral area around the vehicle, which includes the present position identified by the present position identifying unit, the specific road configuration information being retrieved from the road configuration information stored in the storage medium, and a display unit for displaying the image selected by the selecting unit.

With the above arrangement, the vehicle periphery display control system can switch between the images captured by the cameras to be displayed by the display unit based on the road configuration information.

In the vehicle periphery display control system, the selecting unit may identify the number of lanes of a road on which the vehicle is traveling based on the present position and the specific road configuration information of the peripheral area around the vehicle, and may select either one of the images captured by the cameras based on the identified number of leans, to be displayed by the display unit.

The selecting unit may identify a lane of a road in which the vehicle is traveling based on the present position and the specific road configuration information of the peripheral area around the vehicle, and may select either one of the images captured by the cameras based on the identified lane and the specific road configuration information, to be displayed by the display unit.

The selecting unit may select either one of the images captured by the cameras based on a planned route along which the vehicle is to travel.

The images captured by the cameras may include an image captured by a front camera mounted on a front end of the vehicle and having a field of view including lateral areas of the vehicle, and the selecting unit may select the image captured by the front camera to be displayed by the display unit when the vehicle enters an intersection.

When the vehicle enters the intersection, therefore, the display unit displays an image covering blind corners in the intersection.

The display unit may be arranged to produce a warning sound each time the image displayed by the display unit changes to another image.

The vehicle periphery display control system may further comprise an input unit for entering a user's action, wherein the selecting unit may change an image display format of the image displayed by the display unit based on the user's action entered by the input unit.

According to the present invention, there is provided a system for controlling the display of peripheral images of a vehicle which are captured respectively by a plurality of cameras mounted in respective different positions on the vehicle. The system includes a positioning unit for identifying the present position of the vehicle on a road, a display unit for selectively displaying the peripheral images captured by the cameras for being observed by the driver of the vehicle, and an image switching controller for controlling the display unit for displaying either one of the peripheral images captured by the cameras based on road configuration information of the road around the vehicle which includes the present position identified by the positioning unit.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a flowchart of a program run by an image switching decision unit of the vehicle periphery display control system;

FIG. 4 is a flowchart of a subroutine of the program shown in FIG. 3;

FIG. 5 is a flowchart of another subroutine of the program shown in FIG. 3;

FIGS. 8A and 8B are a table showing the relationship between various conditions including the number of lanes, cruising lanes, merging roads, etc. and right- and left-hand vehicle-mounted cameras;

DESCRIPTION OF THE PREFERRED EMBODIMENTS

Figure 1:
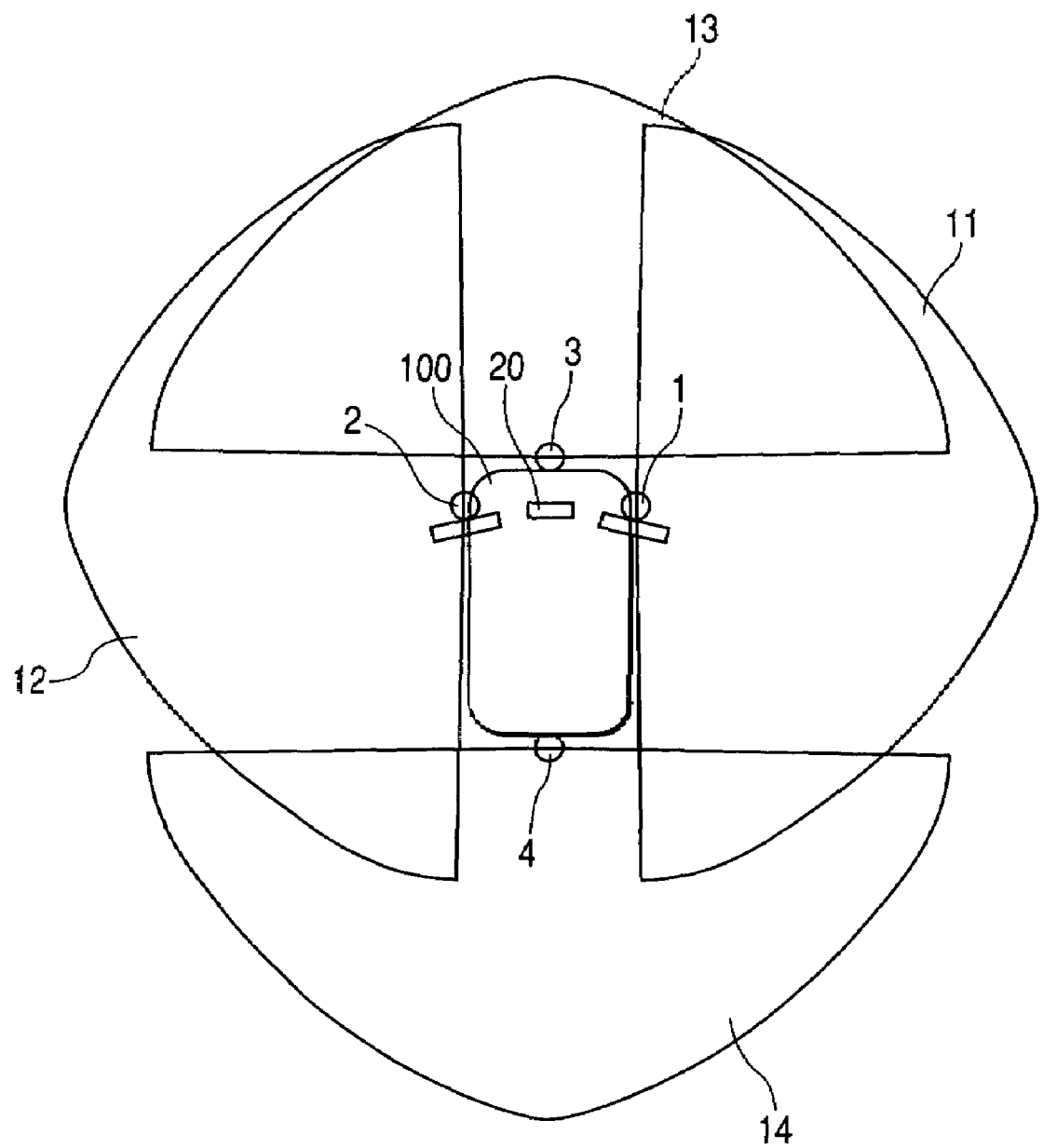
FIG. 1 is a schematic plan view of a vehicle periphery display control system according to an embodiment of the present invention.

FIG. 1 shows a vehicle 100 incorporating a vehicle periphery display control system 20 according to an embodiment of the present invention.

As shown in FIG. 1, the vehicle 100 carries four cameras, i.e., a right-hand vehicle-mounted camera 1, a left-hand vehicle-mounted camera 2, a front vehicle-mounted camera 3, and a rear vehicle-mounted camera 4. The cameras 1 through 4, which are typically video cameras, are mounted in respective different positions on the vehicle 100.

Specifically, the right-hand vehicle-mounted camera 1 is positioned near the right-hand door mirror of the vehicle 100, and the left-hand vehicle-mounted camera 2 is positioned near the left-hand door mirror of the vehicle 100. The front vehicle-mounted camera 3 is positioned on the front end of the vehicle 100, and the rear vehicle-mounted camera 4 is positioned on the rear end of the vehicle 100.

Each of the cameras 1 through 4 has a fish-eye lens for capturing an image of a peripheral area of the vehicle 100.

Specifically, the right-hand vehicle-mounted camera 1 is capable of capturing an image in a range 11 represented by a solid angle of $2\pi$ steradians about a rightward lateral direction perpendicular to the right lateral side the vehicle 100. The left-hand vehicle-mounted camera 2 is capable of capturing an image in a range 12 represented by a solid angle of $2\pi$ steradians about a leftward lateral direction perpendicular to the left lateral side of the vehicle 100. The front vehicle-mounted camera 3 is capable of capturing an image in a range 13 represented by a solid angle of $2\pi$ steradians about a forward direction perpendicular to the front side of the vehicle 100. The rear vehicle-mounted camera 4 is capable of capturing an image in a range 14 represented by a solid angle of $2\pi$ steradians about a rearward direction perpendicular to the rear side of the vehicle 100.

The four cameras 1 through 4 are jointly capable of capturing images of all the front, rear, left, and right peripheral areas of the vehicle 100.

Figure 2:
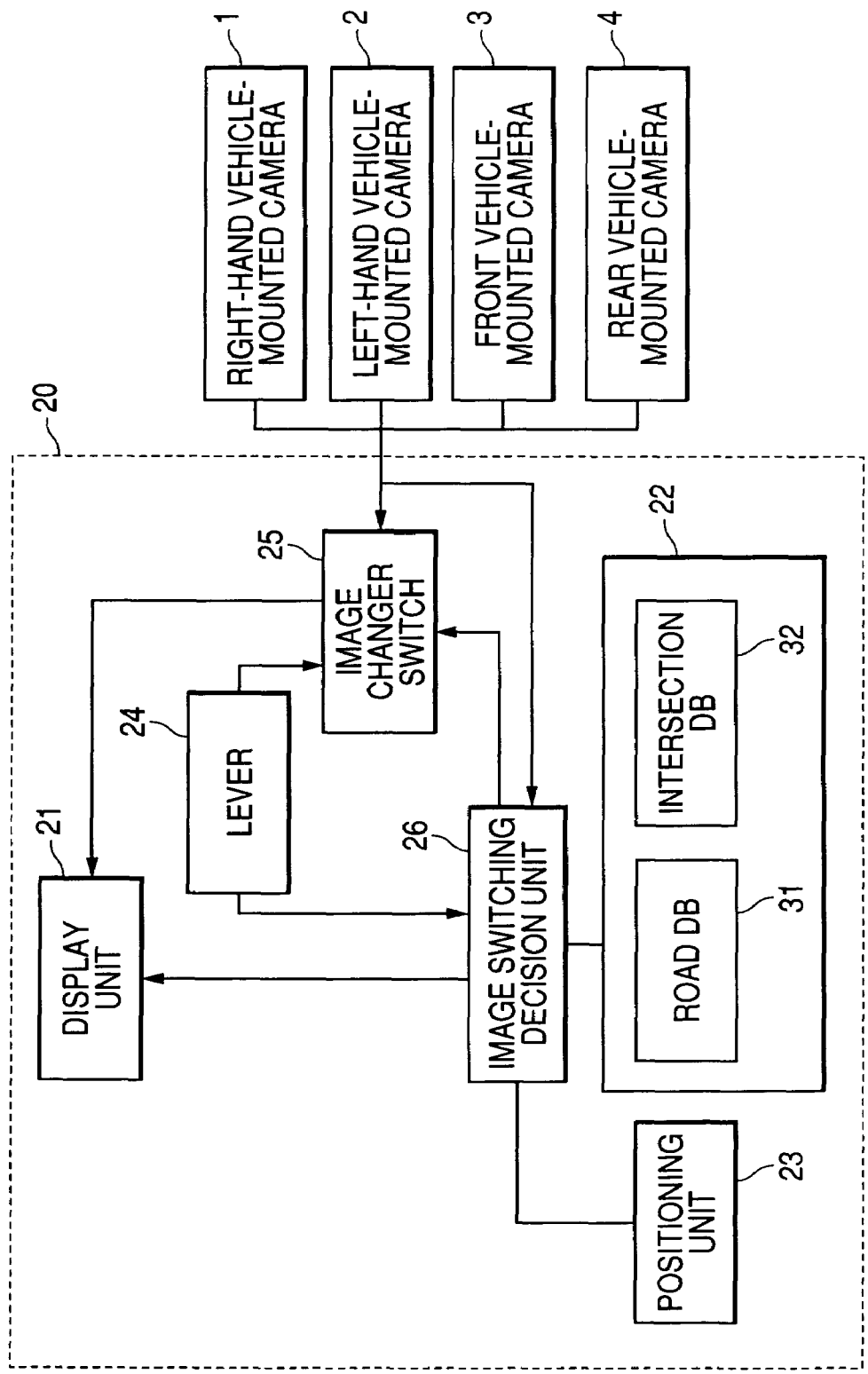
FIG. 2 is a block diagram of a hardware makeup of the vehicle periphery display control system.

The cameras 1 through 4 are electrically connected to the vehicle periphery display control system 20 that is mounted in the vehicle 100. FIG. 2 shows in block form a hardware makeup of the vehicle periphery display control system 20.

As shown in FIG. 2, the vehicle periphery display control system 20 has a display unit 21, a storage medium 22, a positioning unit 23, a lever 24, an image changer switch 25, and an image switching decision unit 26.

The display unit 21 has image display monitors, a speaker for outputting sounds, etc. The display unit 21 also has a microcomputer for processing an image signal received from the image changer switch 25 based on a signal from the image switching decision unit 26, and displaying an image based on the processed image on the image display monitor. The speaker outputs sounds under the control of the image switching decision unit 26.

The storage medium 22 comprises a nonvolatile writable memory such as a hard disk drive or the like. The storage medium 22 stores information representing a road database 31, an intersection database 32, etc., and is controlled by a data write signal and a data read signal from the image switching decision unit 26.

The road database 31 contains information about road configurations of various roads. The information about road configurations refers to information about the positions of the roads, the numbers of lanes of the roads, the widths of the roads, and junctions of the roads including merging roads, branched roads, and intersections.

The intersection database 32 contains intersection information about intersections. The intersection information refers to information about the positions of the intersections, the shapes of the intersections, and the roads connected to the intersections.

The positioning unit 23 has a GPS receiver, a gyroscope, a geomagnetic sensor, etc. that are known in the art. The positioning unit 23 outputs information about the present position of the vehicle 100 that is identified on a road by the GPS receiver and information about the orientation of the vehicle 100 that is identified by the gyroscope and the geomagnetic sensor, to the image switching decision unit 26 periodically, e.g., at periodic intervals of 1 second. The positioning unit 23 also functions as a car navigation unit which, when supplied with an input signal indicative of a destination from the user, calculates a planned route to the destination, and outputs the calculated planned route to the image switching decision unit 26.

The image changer switch 25 outputs some or all of image signals from the cameras 1 through 4 to the display unit 21 based on control signals supplied from the lever 24 and the image switching decision unit 26.

The lever 24 is disposed closely to the driver's seat in the passenger compartment of the vehicle 100. The lever 24 outputs a signal based on an action of the driver to the image changer switch 25 or the image switching decision unit 26.

The image switching decision unit 26 comprises an ordinary microcomputer having a CPU, a RAM, a ROM, etc. When the CPU executes a program stored in the ROM, the image switching decision unit 26 controls the display unit 21 and the image changer switch 25 based on a signal from the lever 24 operated by the driver, information from the positioning unit 23, information read from the storage medium 22, and image signals from the cameras 1 through 4.

Specifically, the image switching decision unit 26 selects either one of images captured by the cameras 1 through 4 based on road configuration information, e.g., the number of lanes, of the road on which the vehicle 100 is currently traveling, a lane along which the vehicle 100 is traveling, and a planned route. The lane along which the vehicle 100 is traveling is determined based on the road configuration information.

The program that the CPU of the image switching decision unit 26 reads from the ROM is illustrated in FIG. 3. When the image switching decision unit 26 is activated such as when the ignition switch of the vehicle 100 is turned on, the image switching decision unit 26 starts executing the program.

In step 110 shown in FIG. 3, the image switching decision unit 26 determines a road on which the vehicle 100 is traveling. FIG. 4 shows details of step 110 as a subroutine of the program.

In step 210 shown in FIG. 4, the image switching decision unit 26 receives present position information representing the present position of the vehicle 100 from the GPS receiver of the positioning unit 23.

In step 220, the image switching decision unit 26 identifies vehicle direction information representing the present direction in which the vehicle 100 is running from the GPS receiver, the gyroscope, and the geomagnetic sensor of the positioning unit 23.

In step 230, the image switching decision unit 26 updates the road configuration information and the intersection information, which are stored in the RAM, in the vicinity of the present position of the vehicle 100. Specifically, based on the present position information acquired in step 210 and the vehicle direction information acquired in step 220, the image switching decision unit 26 identifies a predetermined area around the present position of the vehicle 100, reads road configuration information and intersection information about roads contained in the identified area from the road database 31 and the intersection database 32 that are stored in the storage medium 22, and stores the road configuration information and the intersection information thus read into the RAM. The predetermined area around the present position comprises a rectangular area covering a distance of about 1 km ahead of the present position of the vehicle 100, a distance of about 100 m behind the present position of the vehicle 100, a distance of about 50 m from a left side of the vehicle 100, and a distance of about 50 m from a right side of the vehicle 100.

When the image switching decision unit 26 requires the road configuration information and the intersection information around the vehicle 100 for its processing operation, since the road configuration information and the intersection information around the vehicle 100 have already been read from the storage medium 22 into the RAM, the image switching decision unit 26 does not need to read them from the storage medium 22, which is much slower in access speed than the RAM, and hence can perform its processing sequence faster.

In step 240, the image switching decision unit 26 determines the road in the present position of the vehicle 100. Specifically, the image switching decision unit 26 compares the present position identified in step 210 with the road configuration information stored in the RAM, and identifies a road corresponding to the present position.

In step 250, the image switching decision unit 26 outputs specific road configuration information about the road in the present position, e.g., the number of lanes, merging roads, etc. to the RAM, which stores the specific road configuration information.

After having executed step 110 shown in FIG. 3, the image switching decision unit 26 determines a position in which the vehicle 100 is traveling in step 120. FIG. 5 shows details of step 120 as another subroutine of the program.

In step 310 shown in FIG. 5, the image switching decision unit 26 acquires an image signal from the front vehicle-mounted camera 3 or the rear vehicle-mounted camera 4.

In step 320, the image switching decision unit 26 verifies the specific road configuration information about the road in the present position, which has been output to the RAM in step 250 shown in FIG. 4. Specifically, the image switching decision unit 26 identifies white lines and contour lines on the road from the image signal acquired in step 310 according to known image recognition technology, and estimates the number of lanes on the road from the number of identified white lines and contour lines. Then, the image switching decision unit 26 judges whether the estimated number of lanes is the same as the number of lanes contained in the specific road configuration information stored in the RAM or not. If the image switching decision unit 26 determines that the estimated number of lanes is not the same as the number of lanes contained in the specific road configuration information, then the image switching decision unit 26 may energize the speaker of the display unit 21 to give the driver an audible error signal.

After the image switching decision unit 26 has verified the specific road configuration information about the road in the present position in step 320, control goes to step 330 in which the image switching decision unit 26 identifies a tilt of the white and contour lines on the road from the image signal acquired in step 310, and determines which lane the vehicle 100 is traveling in.

The image switching decision unit 26 identifies a tilt of the white and contour lines on the road by correcting the captured image represented by the image signal out of a fish-eye lens distortion to convert the image into an image as observed by the human eye, and calculating a tilt of the white and contour lines with respect to the horizon in the converted image.

Figure 6:
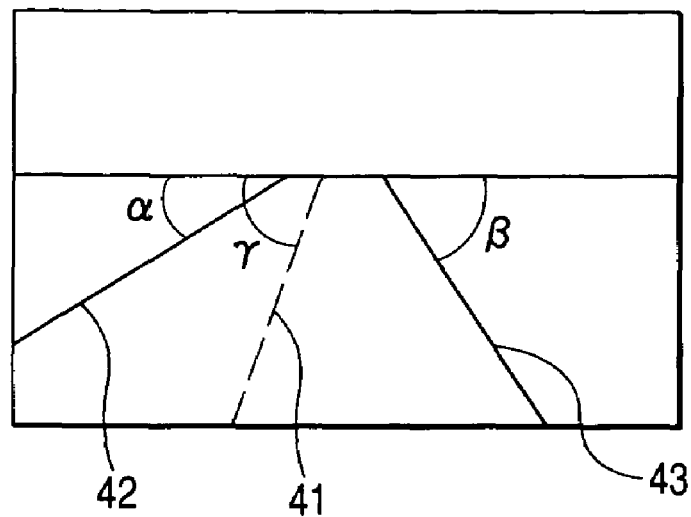
FIG. 6 is a view showing a white line, a left contour line, and a right contour line that are viewed in a front image that is captured from a vehicle which is traveling in the right lane of a two-lane road.
Figure 7:
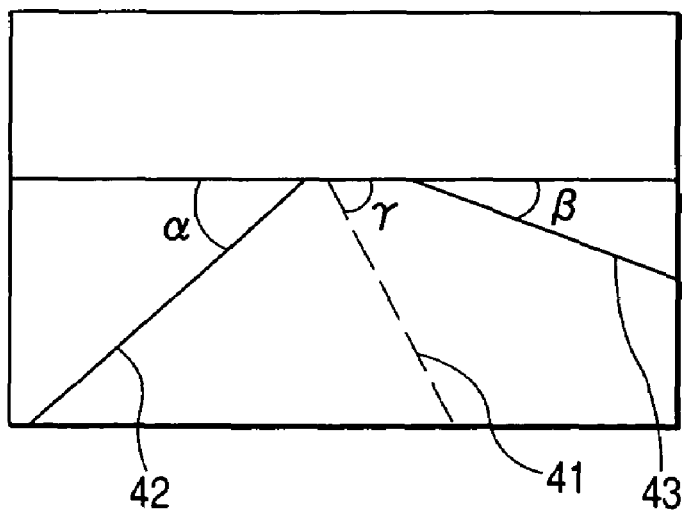
FIG. 7 is a view showing the white line, the left contour line, and the right contour line that are viewed in a front image that is captured from the vehicle which is traveling in the left lane of a two-lane road.

FIGS. 6 and 7 each show a white line 41, a left contour line 42, and a right contour line 43 that are drawn as lane markings on the road, displayed in a distortion-corrected front image. FIG. 6 shows a front image that is captured from the vehicle 100 when the vehicle 100 is traveling in the right lane of a two-lane road, and FIG. 7 shows a front image that is captured from the vehicle 100 when the vehicle 100 is traveling in the left lane of a two-lane road.

On the two-lane road, the image switching decision unit 26 compares an acute angle $\alpha$ of the left contour line 42 with respect to the horizon with an acute angle $\beta$ of the right contour line 43 with respect to the horizon in the captured front image. If $\alpha<\beta$, then the image switching decision unit 26 determines that the vehicle 100 is traveling in the right lane as shown in FIG. 6, and if $\alpha>\beta$, then the image switching decision unit 26 determines that the vehicle 100 is traveling in the left lane as shown in FIG. 7. Alternatively, the image switching decision unit 26 may judge whether an acute angle $\gamma$ of the white line 41 with respect to the horizon is positioned leftward or rightward of the white line 41 in the captured front image. If the acute angle γ is positioned leftward of the white line 41, then the image switching decision unit 26 may determine that the vehicle 100 is traveling in the right lane as shown in FIG. 6, and if the acute angle γ is positioned rightward of the white line 41, then the image switching decision unit 26 may determine that the vehicle 100 is traveling in the left lane as shown in FIG. 7.

On a road with three lanes or more lanes, the image switching decision unit 26 may locate adjacent two of the white and contour lines, whose acute angles with respect to the horizon are on different sides of the lines, e.g., the white line 41 and the right contour line 43 in FIG. 6 or the white line 41 and the left contour line 42 in FIG. 7, and may determine that the vehicle 100 is positioned between those two adjacent lines.

In step 340, the image switching decision unit 26 outputs information about the lane identified in step 330, in which the vehicle 100 is traveling, to the RAM, which stores the supplied information.

After the image switching decision unit 26 has executed step 120 shown in FIG. 3, the image switching decision unit 26 determines a driving mode of the vehicle 100 in step 130. Specifically, the image switching decision unit 26 judges whether the vehicle 100 is accelerating, decelerating, or at rest. The image switching decision unit 26 may determine a driving mode of the vehicle 100 based on a change in the position information received from the positioning unit 23 in the past, or based on an output signal from a vehicle speed sensor, a brake sensor, a throttle sensor, or the like, not shown in FIG. 2, on the vehicle 100.

In step 140, the image switching decision unit 26 selects either one of the vehicle periphery images captured by the cameras 1 through 4 to be displayed on the display unit 21, based on the number of lanes of the road on which the vehicle 100 is travelling, a planned route along which the vehicle 100 is to travel, the lane in which the vehicle 100 is travelling, the driving mode, and whether or not there is a road, ahead of the vehicle 100, merging into the road on which the vehicle 100 is travelling, etc.

FIGS. 8A and 8B are a table showing the relationship between various conditions including the numbers of lanes, cruising lanes, whether the vehicle is to turn left or right, whether there are merging roads, etc. and the right- and left-hand vehicle-mounted cameras 1, 2 that are selected under those conditions. The ROM of the image switching decision unit 26 stores the data of the table shown in FIGS. 8A and 8B, and the CPU of the image switching decision unit 26 identifies a captured image to be displayed on the display unit 21 based on the relationship contained in the table.

The data of the table shown in FIGS. 8A and 8B contain a plurality of entries specified in respective rows, representing respective relationship items. Each of the entries contains, as elements, information about the number of lanes, a lane in which the vehicle is traveling, road/driving information, whether an image captured by the right-hand vehicle-mounted camera 1 is to be selected or not, and whether an image captured by the left-hand vehicle-mounted camera 2 is to be selected or not. Each of the entries may additionally contain information about whether images captured by the front vehicle-mounted camera 3 and the rear vehicle-mounted camera 4 are to be selected or not. In the table shown in FIGS. 8A and 8B, for the entries having the same number of lanes and the same lane in which the vehicle is traveling, the number of lanes and the lane in which the vehicle is traveling are not indicated in the respective rows, but are listed in general categories for the sake of brevity. FIGS. 8A and 8B also show reasons for changing captured images in the rightmost column. These reasons are included for illustrative purposes, and are not actually stored in the ROM of the image switching decision unit 26.

In step 140, if the vehicle 100 is traveling on a simple road having one lane only, then the CPU of the image switching decision unit 26 selects a left rear image that is captured of an area behind the vehicle 100 by the left-hand vehicle-mounted camera 2, to be displayed on the display unit 21. When an image captured by a camera is to be selected for display, it may be selected in part or in its entirety.

That a vehicle is traveling on a simple road refers to a state in which the vehicle is not planning to turn left or right and no other roads will merge into the road in a predetermined front area ahead of the vehicle on the road. The predetermined front area is an area that the vehicle will reach within a predetermined time, e.g., five seconds, if the present vehicle speed is maintained, e.g., an area within a predetermined distance, e.g., 100 m.

As described above, if the vehicle 100 is traveling on a simple road, the left rear image is selected for display because it is desirable for the driver to pay special attention to vehicles, such as motorcycles or the like, moving on the left-hand side of the vehicle 100.

If the vehicle 100 is traveling in the left lane of a two-lane road and there will be a left road merging into the two-lane road in a predetermined front area from the present position of the vehicle 100 on the two-lane road, then the CPU of the image switching decision unit 26 selects a left rear image that is captured of an area behind the vehicle 100 by the left-hand vehicle-mounted camera 2, to be displayed on the display unit 21.

As described above, if the vehicle 100 is traveling in the left lane of a two-lane road and there will be a left merging road, the left rear image is selected for display because it is desirable for the driver to pay special attention to vehicles coming from the left merging road. In this case, the CPU of the image switching decision unit 26 may also select a front image that is captured of an area ahead the vehicle 100 by the left-hand vehicle-mounted camera 2, to be displayed on the display unit 21.

If the vehicle 100 is traveling in the left lane of a two-lane road and there will be a right road merging into the two-lane road in a predetermined front area from the present position of the vehicle 100 on the two-lane road, then the CPU of the image switching decision unit 26 selects a left rear image that is captured of an area behind the vehicle 100 by the left-hand vehicle-mounted camera 2, to be displayed on the display unit 21, and also selects a right rear image that is captured of an area behind the vehicle 100 by the right-hand vehicle-mounted camera 1, to be displayed on the display unit 21.

As described above, if the vehicle 100 is traveling in the left lane of a two-lane road and there will be a right merging road, the left and right rear images are selected for display because it is desirable for the driver to pay special attention to objects, such as motorcycles or the like, moving on the sides of the vehicle 100 and also to pay special attention to vehicles coming from the right merging road. In this case, the CPU of the image switching decision unit 26 may also select a front image that is captured of an area ahead the vehicle 100 by the right-hand vehicle-mounted camera 1, to be displayed on the display unit 21.

When the vehicle 100 is about to reach a junction with a merging road, as described above, the image switching decision unit 26 selects a captured image of the merging road for display.

If the vehicle 100 is traveling in the leftmost lane of a road having three or more lanes and is planning to make a left turn in a predetermined front area, then the CPU of the image switching decision unit 26 selects a left rear image that is captured of an area behind the vehicle 100 by the left-hand vehicle-mounted camera 2, to be displayed on the display unit 21.

The image switching decision unit 26 judges whether the vehicle 100 is planning to make a left turn or not based on the planned route of the vehicle 100 that is supplied from the positioning unit 23.

As described above, if the vehicle 100 is traveling in the leftmost lane of a road having three or more lanes and is planning to make a left turn in a predetermined front area, the left rear image is selected for display because it is desirable for the driver to pay special attention to vehicles, such as motorcycles or the like, moving on the left-hand side of the vehicle 100.

If the vehicle 100 is traveling in an inner lane, not the leftmost or rightmost lane, of a road having three or more lanes and is planning to make a left turn in a predetermined front area, then the CPU of the image switching decision unit 26 selects a left rear image that is captured of an area behind the vehicle 100 by the left-hand vehicle-mounted camera 2, to be displayed on the display unit 21. This is because it is desirable for the driver to pay special attention to a rear area on the left lane as the vehicle 100 needs to change lanes in preparation for making a left turn.

When the vehicle 100 is to change lanes, as described above, the image switching decision unit 26 selects a captured image of the lane that the vehicle 100 is going to move to for display.

If the vehicle 100 is traveling in the right-most lane of a road having three or more lanes and is planning to make a right turn in a predetermined front area, then the CPU of the image switching decision unit 26 selects a right rear image that is captured of an area behind the vehicle 100 by the right-hand vehicle-mounted camera 1, to be displayed on the display unit 21. This is because it is desirable for the driver to pay special attention to vehicles, such as motorcycles or the like, that are running and going to turn right on the right side of the vehicle 100.

As described above, if the vehicle 100 is going to make a right or left turn, the image switching decision unit 26 selects a captured rear image in the direction of the turn.

In other situations, the image switching decision unit 26 selects images for display according to the data in the table shown in FIGS. 8A and 8B. If the vehicle 100 expects a merging road ahead and is also to make a right or left turn, then the image switching decision unit 26 selects a captured image according to the description in the entries with merging roads in FIGS. 8A and 8B.

After having selected in an image to be displayed in step 140, the image switching decision unit 26 selects an image display format based on a signal from the lever 24.

Selective items for image display formats that can be selected include whether a captured image is to be displayed after it is corrected out of a fish-eye lens distortion or not, the height of the horizon in a displayed image, the position of the viewpoint in a displayed image, the width of the field of view of a displayed image, whether the vehicle 100 is to be displayed hypothetically in a displayed image, the transparency of the vehicle 100 in a displayed image, etc.

In step 160, the image switching decision unit 26 controls the display unit 21 to display a selected image. Specifically, the image switching decision unit 26 controls the image changer switch 25 to output an image signal representative of the selected image from one of the cameras 1 through 4 to the display unit 21, and outputs a signal indicative of which part of the image received from the image changer switch 25 is to be displayed in which image display format to the display unit 21. If the image switching decision unit 26 outputs a signal for changing images to be displayed on the display unit 21 at this time, then the image switching decision unit 26 controls the display unit 21 to produce a warning sound such as a chime from the speaker for thereby prompting the driver to pay attention to the displayed image. For giving the driver more attention to the displayed image, the image switching decision unit 26 may output a signal to blink the displayed image to the display unit 21.

After step 160, control goes back to step 110.

According to the processing sequence shown in FIG. 3, an image to be displayed is selected based on the present position of the vehicle 100 in step 150, and the selected image is displayed in step 160. However, an image to be displayed a predetermined time, e.g., one minute, after the present time may be selected and stored in the RAM in step 140, and the image stored in the RAM in step 140 may be displayed as an image at the present time in step 160. Stated otherwise, an image to be displayed may be selected and the image may be displayed on the display unit 21 at different timings that are spaced a minute or minutes from each other.

When the image switching decision unit 26 operates in the manner described above, the vehicle periphery display control system 20 selects either one of images captured by the respective cameras 1 through 4 to be displayed on the display unit 21, based on the road configuration information, e.g., the number of lanes, of the road on which the vehicle 100 is currently traveling, a lane along which the vehicle 100 is traveling, and a planned route, and displays the selected image.

Figure 9:
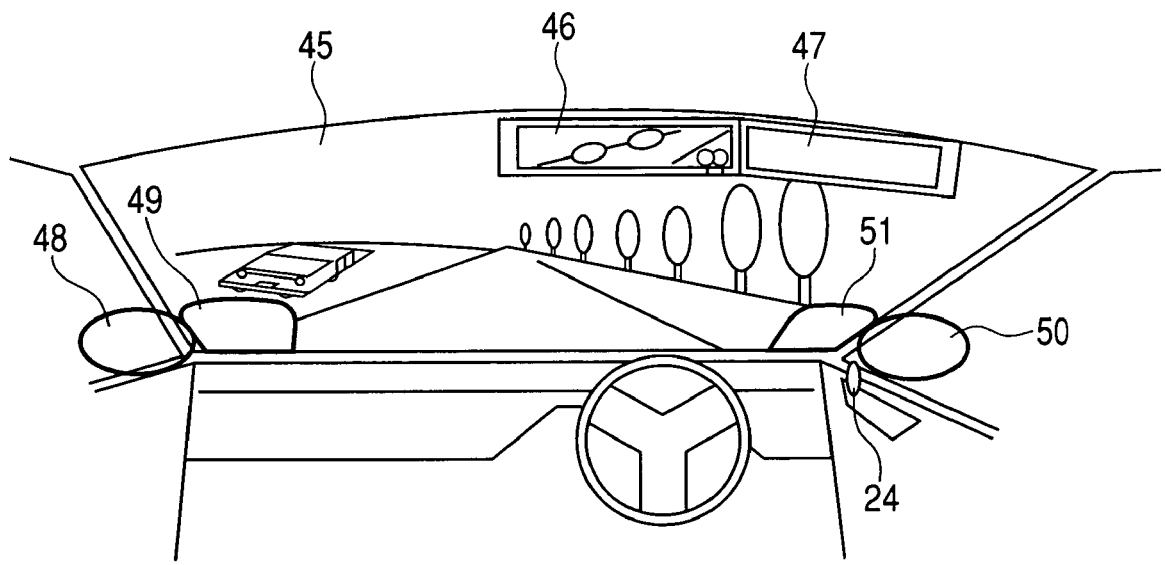
FIG. 9 is a view showing a front region of the passenger's compartment as seen from the driver of the vehicle.

Specific examples of displayed images will be described below. FIG. 9 shows a front region of the passenger's compartment of the vehicle 100 as seen from the driver of the vehicle 100. As shown in FIG. 9, a left display monitor 46 and a right display monitor 47 are mounted on an upper portion of a front windshield 45 of the vehicle which does not obstruct the vision of the driver. A left blind spot monitor 49 is mounted on a lower left corner of the front windshield 45 near a left door mirror 48, and a right blind spot monitor 51 is mounted on a lower right corner of the front windshield 45 near a right door mirror 50. The lever 24 is positioned on the right ride of the driver's seat.

The left display monitor 46, the right display monitor 47, the left blind spot monitor 49, and the right blind spot monitor 51 serve as the image display monitors of the display unit 21, and comprise liquid crystal display monitors.

The display unit 21 displays an image represented by an image signal from the image changer switch 25 selectively on the monitors 46, 47, 49, 51 based on a designation signal from the image switching decision unit 26. Specifically, if an image captured by the left-hand vehicle-mounted camera 2 is to be displayed, it is displayed on the left display monitor 46, and if an image captured by the right-hand vehicle-mounted camera 1 is to be displayed, it is displayed on the right display monitor 47. If an image representative of a left area of an image captured by the front vehicle-mounted camera 3 is to be displayed, it is displayed on the left blind spot monitor 49, and if an image representative of a right area of an image captured by the front vehicle-mounted camera 3 is to be displayed, it is displayed on the right blind spot monitor 51.

In this manner, images to be observed by the driver can be displayed in respective positions that are clearly related to the positions where those images are captured. Images that are not selected at one time by the image switching decision unit 26 are not displayed on the corresponding monitors. Accordingly, the driver's attention is prevented from being distracted unnecessarily by unselected images, but is focused on a selected image only.

Figure 10:
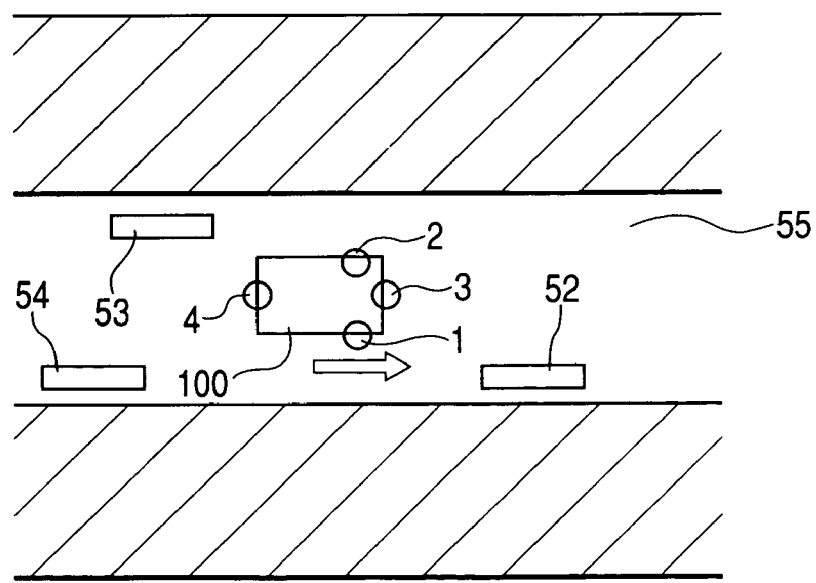
FIG. 10 is a schematic plan view showing a vehicle traveling on a road with objects thereon.

It is now assumed that, as shown in FIG. 10, while the vehicle 100 is traveling in the direction indicated by the arrow on a road 55 with objects 52, 53, 54 being present thereon, an image captured by the left-hand vehicle-mounted camera 2 is displayed on the left display monitor 46, and an image captured by the right-hand vehicle-mounted camera 1 is displayed on the right display monitor 47.

Figure 11:
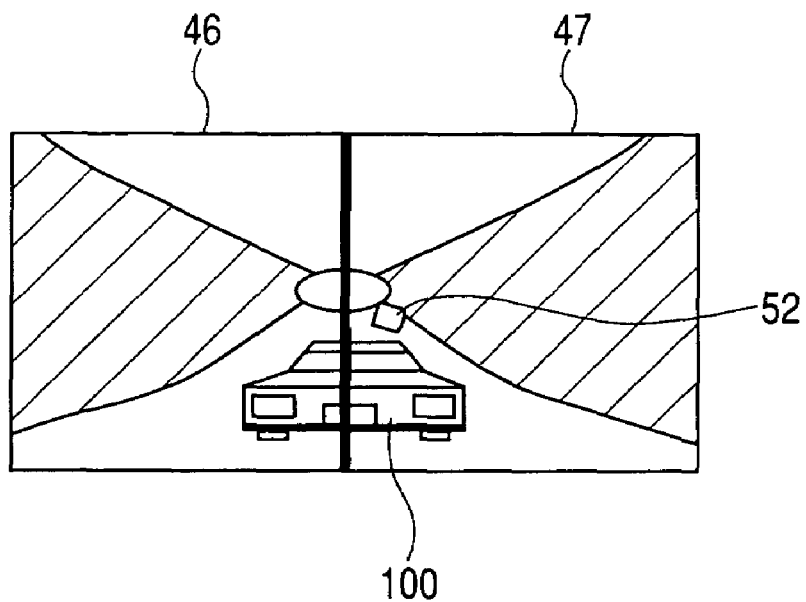
FIG. 11 is a view showing viewpoint-changed front images captured by the right- and left-hand vehicle-mounted cameras and displayed on right and left display monitors when the vehicle is traveling on the road as shown in FIG. 10.

FIG. 11 shows viewpoint-changed front images captured by the right- and left-hand vehicle-mounted cameras 1, 2 and displayed on the right and left display monitors 47, 46 when the vehicle 100 is traveling on the road 55 as shown in FIG. 10. In FIG. 11, when the front images are corrected out of a fish-eye lens distortion, their viewpoints are changed to positions behind the vehicle 100, and the vehicle 100 is hypothetically displayed in those front images. Whether the images are to be corrected out of a fish-eye lens distortion or not, the height of the horizon in the images, the position of the viewpoint in the images, the width of the field of view of the images, whether the vehicle 100 is to be displayed hypothetically in the displayed images, and the transparency of the vehicle 100 in the images can be changed by the lever 24 operated by the driver in addition, the driver can operate the lever 24 to select which ones of the images captured by the cameras 1 through 4 are to be displayed.

Figure 12:
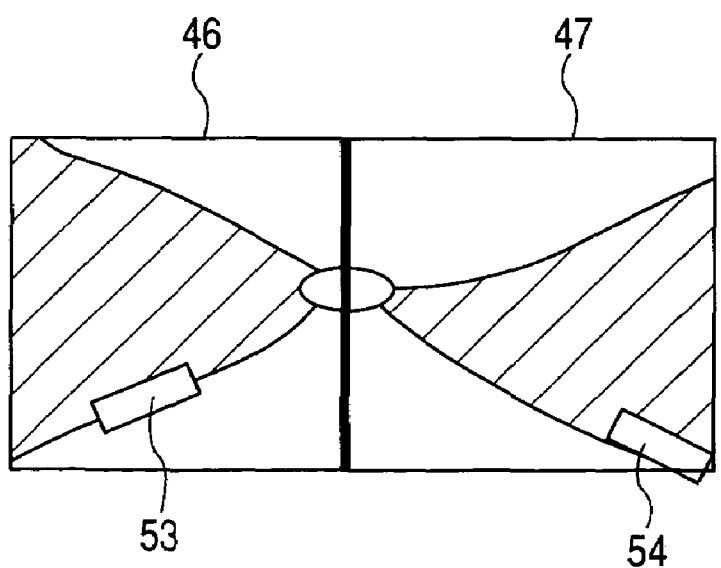
FIG. 12 is a view showing rear images captured by the right- and left-hand vehicle-mounted cameras when the vehicle is traveling on the road as shown in FIG. 10.

FIG. 12 shows rear images captured by the right- and left-hand vehicle-mounted cameras 1, 2 and displayed on the right and left display monitors 47, 46 when the vehicle 100 is traveling on the road 55 as shown in FIG. 10. As shown in FIG. 12, an image of the object 53 that is positioned leftward and rearward of the vehicle 100 is displayed on the left display monitor 46, and an image of the object 54 that is positioned rightward and rearward of the vehicle 100 is displayed on the right display monitor 47. Therefore, a captured image of an area leftward and rearward of the vehicle 100 is displayed on the left display monitor 46, and a captured image of an area rightward and rearward of the vehicle 100 is displayed on the right display monitor 47. These displaced images are horizontally inverted mirror images of the scene which the driver would see with its own eyes when turned back to look behind the vehicle 100. The mirror images displayed on the left display monitor 46 and the right display monitor 47 allow the driver to visually recognize the scene behind the vehicle 100 as if looking by the rearview mirrors.

Figure 13:
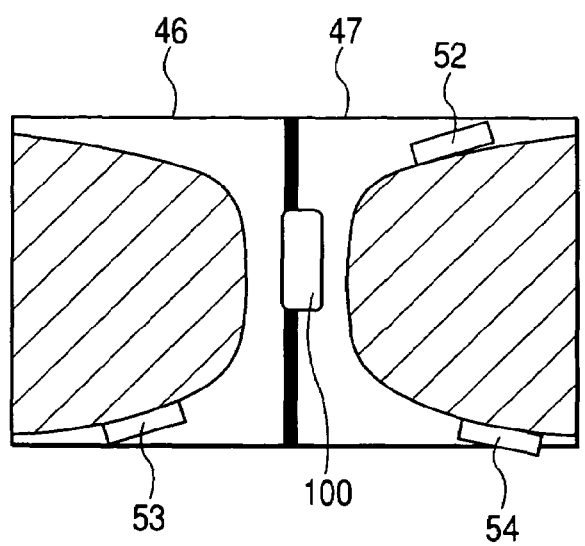
FIG. 13 is a view showing all images captured by the right- and left-hand vehicle-mounted cameras and displayed on right and left display monitors when the vehicle is traveling on the road as shown in FIG. 10, the images being not corrected out of a fish-eye lens distortion.

FIG. 13 shows all images captured by the right- and left-hand vehicle-mounted cameras 1, 2 and displayed on the right and left display monitors 47, 46 when the vehicle 100 is traveling on the road 55 as shown in FIG. 10; the images being not corrected out of a fish-eye lens distortion. When the images are displayed on the right and left display monitors 47, 46 as shown in FIG. 13, the driver can visually confirm the objects 52, 53, 54 around the vehicle 100 all at once in the displayed images.

Figure 14:
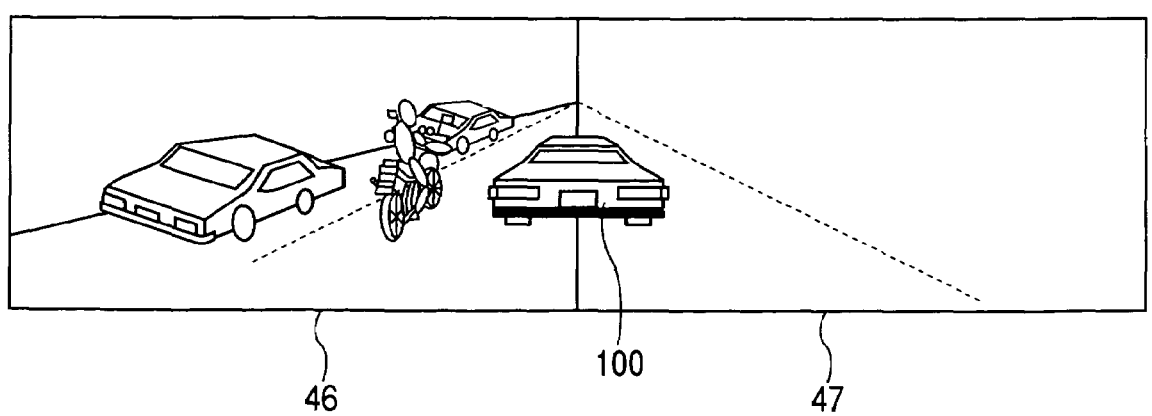
FIG. 14 is a view showing viewpoint-changed images of front and rear areas of the vehicle, the images being corrected out of a fish-eye lens distortion.
Figure 15:
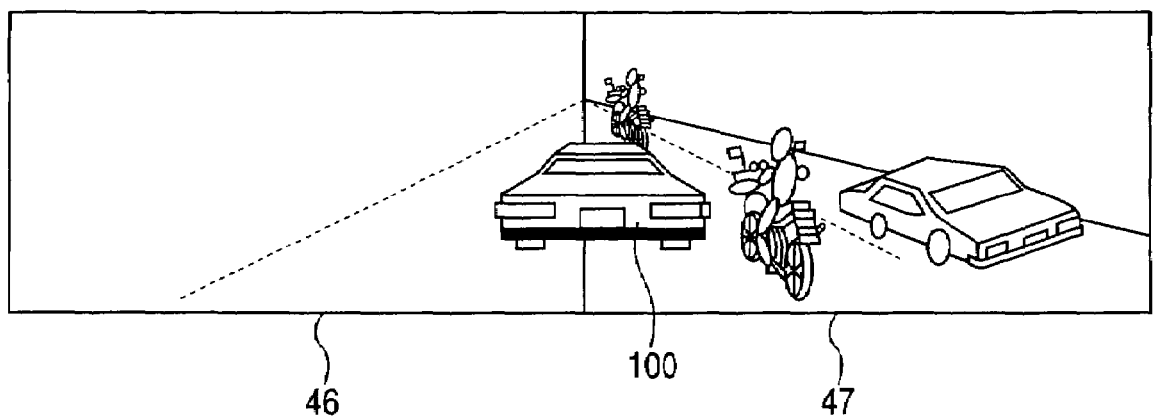
FIG. 15 is a view showing other viewpoint-changed images of front and rear areas of the vehicle, the images being corrected out of a fish-eye lens distortion.

Images that are captured of areas ahead of and behind the vehicle 100 and corrected out of a fish-eye lens distortion may be displayed on the right and left display monitors 47, 46 as shown in FIGS. 14 and 15. In FIGS. 14, 15, the viewpoints of the images are changed to positions behind the vehicle 100, and a front field of view is selected by the lever 24 to allow the driver to visually recognize objects ahead of and behind the vehicle 100 at the same time.

The vehicle periphery display control system 20 can thus switch between displayed images based on the road configuration information, etc. by selecting one at a time of images captured by the cameras 1 through 4 of the periphery of the vehicle 100.

The image switching decision unit 26 may select other images to be displayed than the images described above, in cases (1) through (3) below.

(1) When the vehicle 100 enters an intersection, the image switching decision unit 26 displays left and right areas of an image captured by the front vehicle-mounted camera 3 respectively on the left blind spot monitor 49 and the right blind spot monitor 51.

Specifically, when the image switching decision unit 26 detects that the vehicle 100 is about to reach an intersection, e.g., enters a distance of 3 m from an intersection, based on the position information from the positioning unit 23 and the intersection information from the intersection database 32, the image switching decision unit 26 selects images of areas on the lateral sides of the leading end of the vehicle 100, i.e., images of blind corners for the driver of a road crossing the road on which the vehicle 100 is traveling, to be displayed on the left blind spot monitor 49 and the right blind spot monitor 51. When the selected images are actually displayed, the image switching decision unit 26 controls the speaker of the display unit 21 to produce speech sound or a chime to let the drive know that the blind corners are displayed.

Figure 16:
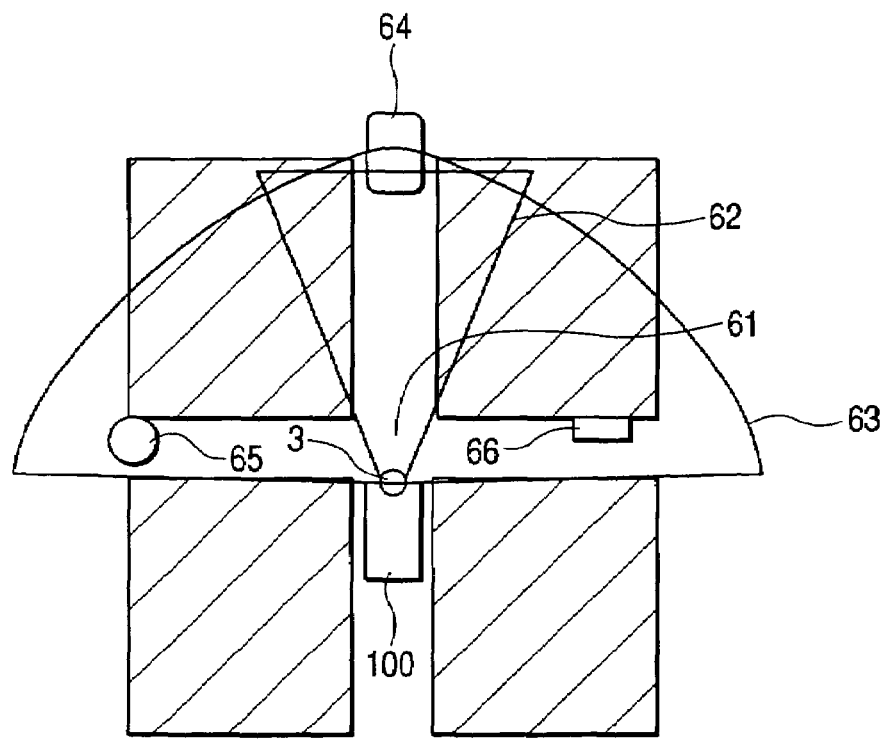
FIG. 16 is a schematic plan view showing the vehicle as it enters an intersection.

FIG. 16 shows the vehicle 100 as it enters an intersection 61. Since the field of view of the driver of the vehicle 100 is usually indicated as an inverted triangular area 62, the driver can confirm a front vehicle 64 positioned ahead of the vehicle 100, and cannot confirm objects 65, 66 that are positioned on the crossing road outside of the inverted triangular area 62. However, since the front vehicle-mounted camera 3 has a wide field of view indicated as an area 63, the front vehicle-mounted camera 3 can image the objects 65, 66 on the crossing road. When the captured images of the objects 65, 66 are displayed on the left blind spot monitor 49 and the right blind spot monitor 51, the driver can quickly sense the danger of a possible collision with an oncoming vehicle from the crossing road. The image switching decision unit 26 may select those images of areas on the lateral sides of the leading end of the vehicle 100 to be displayed on the display unit 21 only when the speed of the vehicle 100 is lower than a predetermined threshold speed of 10 km/hour, for example. This is because most intersections that require vehicle drivers to confirm blind corners prior to entering them are marked with a stop sign, making the vehicles move slowly forward beyond the stop line.

Alternatively, the image switching decision unit 26 may judge whether there is a stop sign at an intersection or not based on a captured image from the front vehicle-mounted camera 3, and, if there is a stop sign, then the image switching decision unit 26 may select images of blind corners from the front vehicle-mounted camera 3 to be displayed on the display unit 21.

(2) The image switching decision unit 26 selects either one of images captured by the cameras 1 through 4 based on the driving mode of the vehicle 100 that is determined in step 130. Specifically, when the vehicle 100 is at rest, the image switching decision unit 26 selects an image of a rear area of an image captured by the right-hand vehicle-mounted camera 1 to be displayed on the right display monitor 47 in preparation for the vehicle 100 to move to the right. When the vehicle 100 is accelerating, the image switching decision unit 26 selects an image of a rear area of an image captured by the right-hand vehicle-mounted camera 1 to be displayed on the right display monitor 47 in preparation for the vehicle 100 to change lanes for overtaking other vehicles on the road. After the vehicle 100 has changed lanes, the image switching decision unit 26 selects an image captured by the left-hand vehicle-mounted camera 2 to be displayed on the left display monitor 46 for the driver to confirm the overtaking attempt. The image switching decision unit 26 may select images of blind corners only when the vehicle 100 is about to reach an intersection and also is decelerating.

(3) When the vehicle 100 is about to reach a junction with a merging road, the image switching decision unit 26 selects either one of images captured by the cameras 1 through 4 based on the distance from the junction to the vehicle 100.

Figure 17:
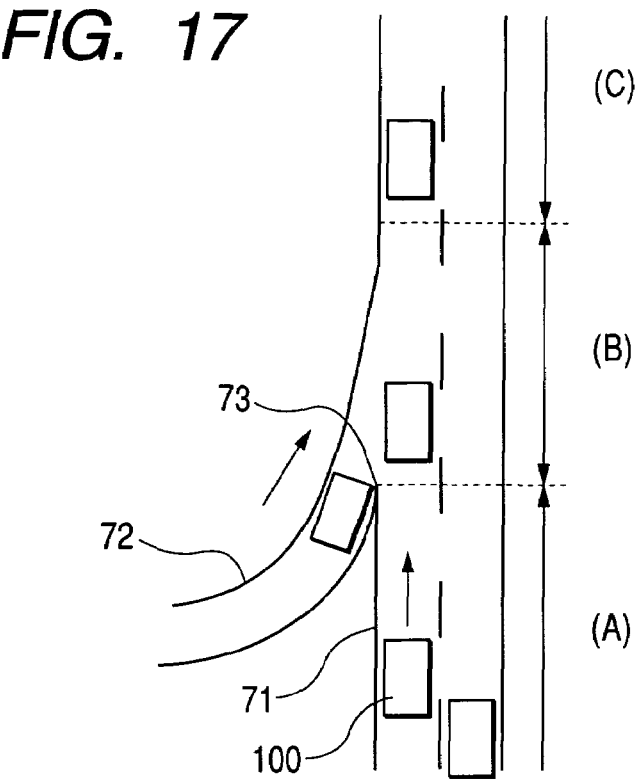
FIG. 17 is a schematic plan view showing the vehicle as it is about to reach an interchange as a merging road while running in a cruising lane of an expressway.

An example in which the vehicle 100 approaches a junction with a merging road is illustrated in FIG. 17. In FIG. 17, the vehicle 100 traveling in a cruising lane of an expressway 71 is about to reach a junction 73 with an interchange 72 as a merging road, e.g., the vehicle 100 has entered a distance of 500 m from the junction 73.

When the vehicle 100 is in a range (A) shown in FIG. 17, i.e., before the junction 73, since the vehicle 100 is traveling in the cruising lane, the image switching decision unit 26 selects an image of a rear area of an image captured by the right-hand vehicle-mounted camera 1 to be displayed on the right display monitor 47 for the driver to confirm whether there are vehicles traveling in an overtaking lane adjacent to the cruising lane or not. The image switching decision unit 26 selects such an image in preparation for possibly changing to the overtaking lane. At this time, the image switching decision unit 26 may control the display unit 21 to energize the speaker to produce a speech guidance "WE ARE GOING TO REACH MERGING ROAD AT INTERSECTION. CHECK OUT MOVING TO OVERTAKING LANE." In addition, the image switching decision unit 26 may control the display unit 21 to blink the image displayed on the right display monitor 47.

If the vehicle periphery display control system 20 has a radar-based vehicle detector or a steering angle sensor, then when the driver turns the steering wheel clockwise to move to the right lane, and the steering angle sensor detects the steered angle of the steering wheel or the radar-based vehicle detector detects a vehicle on the right lane to which the vehicle 100 is steered, the image switching decision unit 26 may control the display unit 21 to energize the speaker to produce a speech warning "VEHICLE ON RIGHT REAR SIDE" or the like.

When the vehicle 100 is in a range (B), i.e., within a distance of 200 m ahead of the junction 73, the image switching decision unit 26 selects a captured image of the merging road 72 to be displayed on the display unit 21, and controls the display unit 21 to energize the speaker to produce a speech guidance "MERGING ROAD OF INTERSECTION ON RIGHT SIDE. CONFIRM ONCOMING VEHICLE MOVING TO THROUGH LINE." for prompting the driver to pay attention any oncoming vehicles from the merging road 72. At the same time, the image switching decision unit 26 controls the display unit 21 to blink the image displayed on the left display monitor 46. In this case, the image switching decision unit 26 selects an image of a rear area of an image captured by the left-hand vehicle-mounted camera 2 to be displayed on the display unit 21. The driver is now capable of confirming whether there are oncoming vehicles approaching from the interchange 72 on the rear side of the vehicle 100.

If a vehicle is moving from the interchange 72 to a position just ahead of the vehicle 100 at a close distance to the vehicle 100, then the vehicle 100 may automatically be braked.

When the vehicle 100 is in a range (C), i.e., beyond a distance of 200 m ahead of the junction 73, the image switching decision unit 26 controls the display unit 21 to energize the speaker to produce a speech guidance "WE HAVE PASSED THROUGH MERGING ROAD OF INTERSECTION. IF YOU WANT TO CHANGE TO OVERTAKING LANE, CONFIRM VEHICLES IN OVERTAKING LANE.", and selects an image of a rear area of an image captured by the right-hand vehicle-mounted camera 1 to be displayed on the right display monitor 47 for the driver to confirm whether there are vehicles traveling in the overtaking lane.

Figure 18:
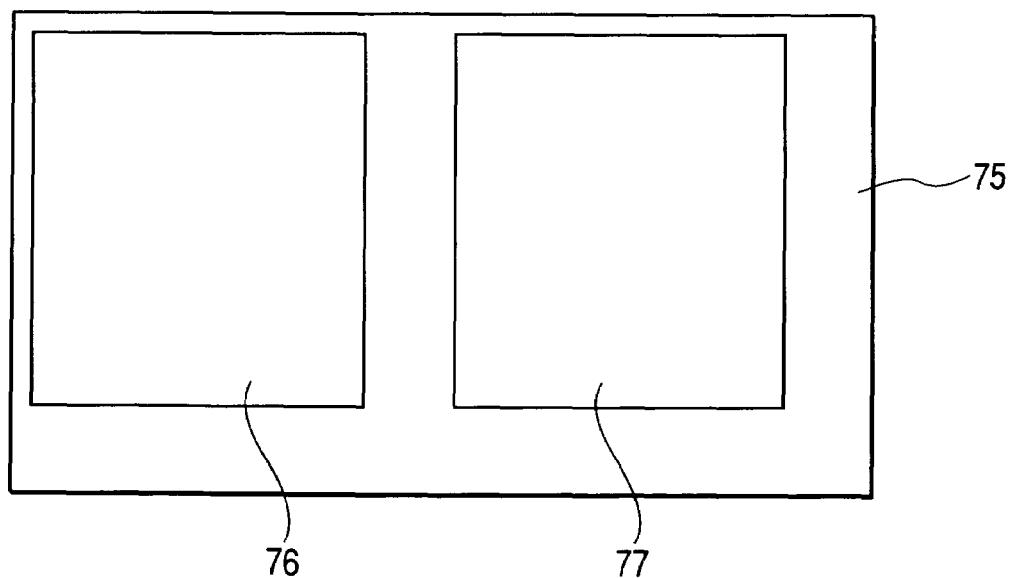
FIG. 18 is a view showing another display monitor for a display unit of the vehicle periphery display control system.

As shown in FIG. 18, the display unit 21 may employ a display monitor 75 of the instrumental panel of the vehicle 100 for displaying images captured by the cameras 1 through 4. The display monitor 75 may include a left display area 76 for displaying an image captured by the left-hand vehicle-mounted camera 2 and a right display area 77 for displaying an image captured by the right-hand vehicle-mounted camera 1.

In the above embodiment, both the storage medium 22 and the RAM of the image switching decision unit 26 serve as a storage medium for storing road configuration information.

The positioning unit 26 serves as a present position identifying unit.

The image switching decision unit 26 serves as a selecting unit or an image switching controller.

Although a certain preferred embodiment of the present invention has been shown and described in detail, it should be understood that various changes and modifications may be made therein without departing from the scope of the appended claims.

What is claimed is:

1. A vehicle periphery display control system which displays peripheral images of a vehicle which are captured by a plurality of cameras mounted on the vehicle in respective different positions thereon, comprising:
    a storage medium configured to store road configuration information;
    a present position identifying unit configured to identify the present position of the vehicle;
    a selecting unit configured to select at least one of images captured by the cameras based on specific road configuration information of a peripheral area around the vehicle, which includes the present position identified by said present position identifying unit, said specific road configuration information being retrieved from the road configuration information stored in said storage medium;
    a display unit configured to display the image selected by said selecting unit; and
    an input unit configured to enter a user's action and output a signal responsive to the user's action; wherein
    the selecting unit is configured to communicate with the plurality of cameras each configured with a fish-eye lens, the cameras being disposed to jointly capture images of all front, rear, left, and right peripheral areas of the vehicle,
    the selecting unit is configured to display a display format of the selected image based on the signal from the input unit, and use selective items for the display format including whether or not the selected image is to be corrected out of a distortion by the fish-eye lens, a position of a viewpoint in the selected image, and whether the vehicle is to be displayed hypothetically in the selected image,
    the display unit is configured to display the selected image based on the display format selected by the selecting unit, and
    the display unit includes a plurality of monitors and is configured to display the selected image on at least one of the monitors disposed at a position corresponding to a position where the selected image is captured.

2. A vehicle periphery display control system according to claim 1, wherein said selecting unit is configured to identify the number of lanes of a road on which the vehicle is traveling based on said present position and said specific road configuration information of the peripheral area around the vehicle, and to select at least one of the images captured by the cameras based on the identified number of lanes, to be displayed by said display unit.

3. A vehicle periphery display control system according to claim 1, wherein said selecting unit is configured to identify a lane of a road in which the vehicle is traveling based on said present position and said specific road configuration information of the peripheral area around the vehicle, and to select at least one of the images captured by the cameras based on the identified lane and said specific road configuration information, to be displayed by said display unit.

4. A vehicle periphery display control system according to claim 1, wherein said selecting unit is configured to select at least one of the images captured by the cameras based on a planned route along which said vehicle is to travel.

5. A vehicle periphery display control system according to claim 1, wherein the images captured by the cameras include an image captured by a front camera mounted on a front end of the vehicle and having a field of view including lateral areas of the vehicle, and said selecting unit selects the image captured by the front camera to be displayed by said display unit when the vehicle enters an intersection.

6. A vehicle periphery display control system according to claim 1, wherein said display unit produces a warning sound each time the image displayed by said display unit changes to another image.

7. A system which controls the display of peripheral images of a vehicle which are captured respectively by a plurality of cameras mounted in respective different positions on the vehicle, comprising:
   a positioning unit configured to identify the present position of the vehicle on a road;
   a storage unit configured to store road configuration information;
   a display unit configured to selectively display the peripheral images captured by the cameras for being observed by a driver of the vehicle;
   an input unit configured to enter a user's action; and
   an image switching controller configured to control said display unit for displaying at least one of the peripheral images captured by the cameras based on the road configuration information of the road around the vehicle which includes the present position identified by said positioning unit; wherein
   the image switching control is configured to communicate with the plurality of cameras each configured with a fish-eye lens, the cameras being disposed to jointly capture images of all front, rear, left, and right peripheral areas of the vehicle,
   the image switching controller is configured to select a display format of the captured image based on a signal from the input unit, and use selective items for the display format including whether or not the captured image is to be corrected out of a distortion by the fish-eye lens, a position of a viewpoint in the captured image, and whether the vehicle is to be displayed hypothetically in the captured image,
   the display unit is configured to display the captured image based on the display format selected by the image switching controller, and
   the display unit includes a plurality of monitors and is configured to display the captured image on at least one of the monitors disposed at a position corresponding to a position where the captured image is captured.

8. A system according to claim 7, wherein said road configuration information includes the number of lanes of the road and the lane in which the vehicle is currently traveling.

9. A system according to claim 8, wherein said road configuration information further includes a merging road joined to said road.

10. A system according to claim 8, wherein said road configuration information further includes a turn to be made by the vehicle.

11. A system according to claim 8, wherein said road configuration information further includes a planned route along which the vehicle is to travel.

12. A vehicle periphery display control system according to claim 1,
   further comprising the plurality of cameras, each configured with the fish-eye lens, mounted on the vehicle,
   wherein the cameras each configured with the fish-eye lens are disposed to capture images such that the collective images from the cameras continuously cover a 360 degree field of view around the vehicle,
   the selecting unit being configured to select from the images continuously covering the 360 degree field for display.

13. A vehicle periphery display control system according to claim 1, wherein
   when the selected image is to be corrected out of distortion by the fish-eye lens, a viewpoint of the selected image is changed to a position behind the vehicle and the vehicle is displayed hypothetically in the image, and
   when the selected image is not corrected out of distortion by the fish-eye lens, the viewpoint is not changed.

14. A system according to claim 7,
   further comprising the plurality of cameras, each configured with the fish-eye lens, mounted on the vehicle,
   wherein the cameras each configured with the fish-eye lens are disposed to capture images such that the collective images from the cameras continuously cover a 360 degree field of view around the vehicle,
   the selecting unit being configured to select from the images continuously covering the 360 degree field for display.

15. A system according to claim 7, wherein
   when the selected image is to be corrected out of distortion by the fish-eye lens, a viewpoint of the selected image is changed to a position behind the vehicle and the vehicle is displayed hypothetically in the image, and
   when the selected image is not corrected out of distortion by the fish-eye lens, the viewpoint is not changed.

* * * * *